(12) United States Patent
Mason

(10) Patent No.: US 6,280,694 B1
(45) Date of Patent: Aug. 28, 2001

(54) SINGLE STAGE DENITRATION

(75) Inventor: J Bradley Mason, Pasco, WA (US)

(73) Assignee: Studsvik, Inc., Erwin, TN (US)

( * ) Notice: Subject to any disclaimer, the term of this patent is extended or adjusted under 35 U.S.C. 154(b) by 0 days.

(21) Appl. No.: 09/421,612

(22) Filed: Oct. 20, 1999

(51) Int. Cl.$^7$ ................................. B01J 8/08; B01J 8/18
(52) U.S. Cl. .......................................... 423/239.1
(58) Field of Search ................................. 423/235, 239.1

(56) References Cited

U.S. PATENT DOCUMENTS

| | | | |
|---|---|---|---|
| 4,218,427 | 8/1980 | Yan | 423/239 |
| 4,226,830 | 10/1980 | Davis | 422/143 |
| 4,483,692 | 11/1984 | Patel | 48/210 |
| 4,609,537 | * 9/1986 | Tolpin | 423/244 |
| 4,656,147 | 4/1987 | Iida et al. | 502/26 |
| 4,662,081 | 5/1987 | Greenwood | 34/22 |
| 4,664,678 | 5/1987 | Rehmat et al. | 48/62 R |
| 4,665,632 | 5/1987 | Greenwood | 34/168 |
| 4,966,101 | 10/1990 | Maeda et al. | 110/245 |

* cited by examiner

Primary Examiner—Steven P. Griffin
Assistant Examiner—Maribel Medina
(74) Attorney, Agent, or Firm—Michael A Mann; Nexsen Pruet Jacobs & Pollard LLC

(57) ABSTRACT

A system and method is described having a single reaction vessel using superheated steam optionally augmented by oxygen for reducing nitrogen oxides present in a wide variety of organic compounds. Reduction takes place quickly when a steam/oxygen mixture is injected into a fluidized bed of ceramic beads. Reducing additives are metered into the reaction vessel and/or provide energy input to reduce nitrates to nitrogen. The speed of the fluidizing gas mixture agitates the beads that then help to break up solid wastes and to allow self-cleaning through abrasion thereby eliminating agglomerates, and the oxygen, when used, allows for some oxidation of waste by-products and provides an additional offset for thermal requirements of operation.

31 Claims, 1 Drawing Sheet

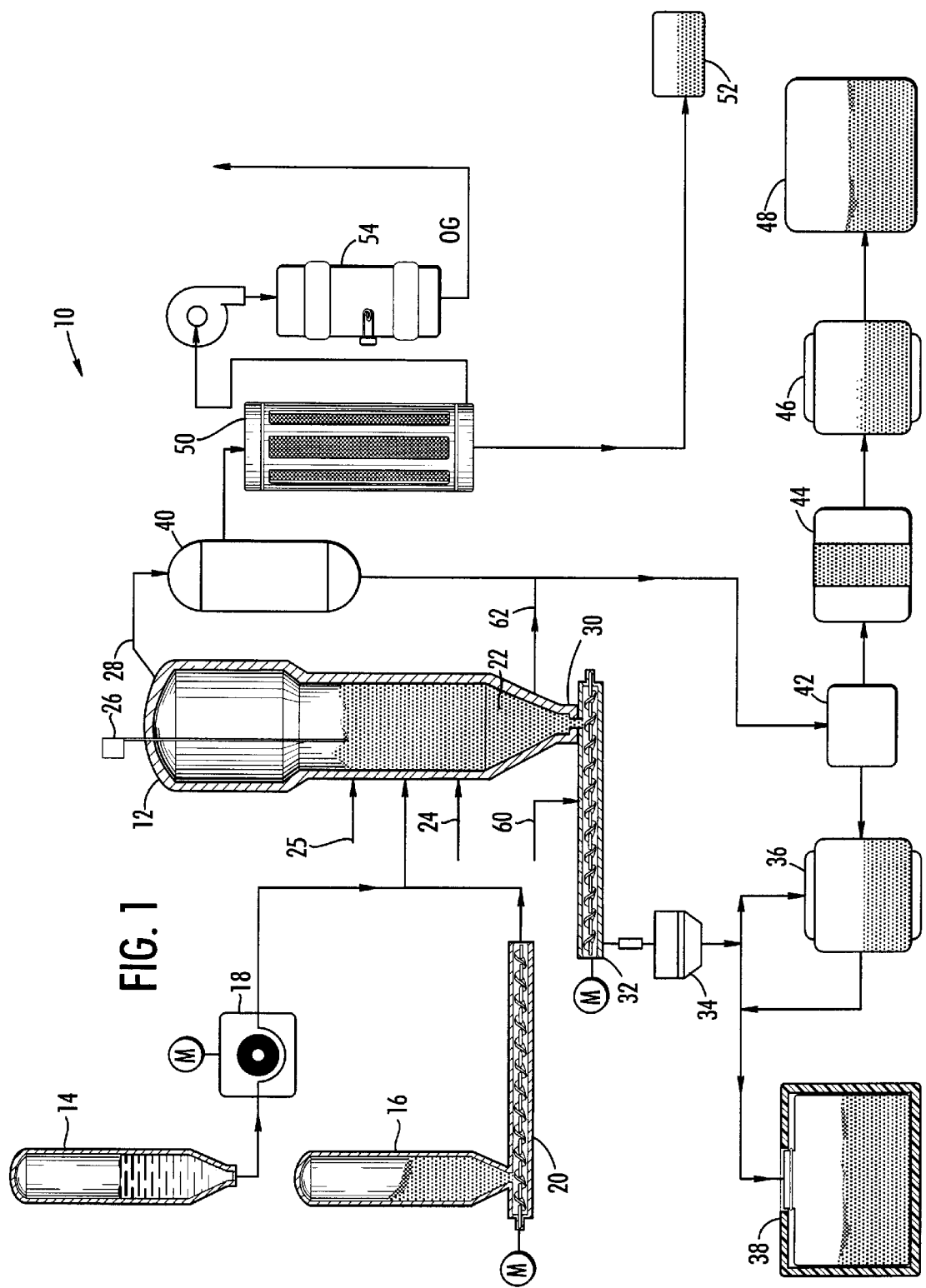

SINGLE STAGE DENITRATION

FIELD OF THE INVENTION

The present invention relates generally to a single stage process for removing NOx compounds from waste products, compounds and wastewaters. More specifically, the invention relates to a single stage process utilizing a fluidized bed container to remove NOx compounds from explosive, hazardous and/or radioactive materials.

BACKGROUND OF THE INVENTION

Nitrogen oxides can be commonly found in many waste products and compounds. Nitrogen oxides (referred to herein as "NOx") include such compounds as nitric acid, aluminum nitrate, sodium nitrate, ammonium nitrate, potassium nitrate and the like.

Traditional approaches to removing NOx include dry contact reduction processes for solid and gaseous nitrate compounds and wet absorption processes for gaseous NOx. Dry contact reduction processes may be either catalytic or non-catalytic and may be either selective or non-selective. Selective reduction processes are characterized by the selective reduction of gaseous nitrogen oxides and their consequent removal in the presence of oxygen. A common selective reduction agent for gaseous NOx is ammonia. Ammonia, however, oxidizes to form unwanted nitrogen oxide at high temperatures. Moreover, excess ammonia is itself a pollutant.

In the drawings, Other selective reduction methods employ catalysts such as iridium. The problem with catalyst reduction is that the presence of particulates, sulfurous acid gases and other poisons reduce catalyst effectiveness and life thereby increasing costs.

Non-selective reduction processes generally involve the addition of a reducing agent to the gaseous NOx containing material, consuming all free oxygen through combustion and reducing the NOx to nitrogen by the remaining reducing agent. Catalysts are typically utilized in these processes. Reducing agents useful in these processes are both scarce and expensive.

Wet absorption processes typically require large and expensive equipment such as absorption towers. An example of a wet absorption process is the absorption of nitrogen oxides by water or alkali solution. Another shortcoming of the wet absorption process is that these methods are not economically effective where the NOx concentration in the gaseous waste stream is above 5,000 ppm.

In the nuclear industry, there is an annual production of significant amounts of wastes which are classified as radioactively contaminated salt cakes, ion exchange media, sludges and solvents. These radioactive wastes either contain nitrogen oxides or nitrogen oxides are produced as part of the treatment of these wastes. In particular, nuclear fuel reprocessing with nitric acid produces highly radioactive nitric acid and sodium nitrate waste by-products.

For solid or slurry NOx wastes and compounds a variety of processes have been tried for NOx destruction. Rotary calciner and fluid bed processors have been utilized with typical results yielding less than 90% conversion of solid nitrates to gaseous NOx and nitrogen. The gaseous NOx generally exceeded 10,000 ppm which requires addition of extensive gaseous NOx removal methods as described above. In addition, severe agglomerations occur in processors as well as the presence of flammable or explosive mixtures of nitrates and reducing agents in the processors.

A process which does not have the limitations and shortcomings of the above described prior art methods for nitrogen oxide removal from waste streams and compounds would be highly desirable.

SUMMARY OF THE INVENTION

According to its major aspects and briefly recited, the present invention is a method and apparatus for converting nitrogen oxides directly to nitrogen using a single steam-reformer vessel. Nitrate compounds or wastes are fed into the single vessel along with a fluidized gas composed of steam and oxygen. The single vessel contains an inert media bed made of high-density media, such as amorphous alumina beads up to 3000 microns in diameter. The fluidizing gases are injected at relatively high speeds, ranging up to 800 feet per second.

In a first embodiment of the present invention carbonous materials are used as the heat source to evaporate water in the waste feed and as the principal reducing agent. The vessel is divided into three zones with the lowest most zone operated under oxidizing conditions via the addition of superheated steam with oxygen that reacts with the carbon to form $CO/CO_2$ and generate heat to evaporate water content and heat nitrate compounds to reduction temperature. The middle zone is operated under strongly reducing conditions in which $NO_3$, $NO$, $N_2O$ and $NO_2$ are reduced to $N_2$. Steam reforming of carboneceous materials in this zone forms $CO$, $H_2$ and $CH_4$ that serve as strong gaseous reducing agents. The upper zone is operated under oxidizing conditions via the addition of more oxygen that oxidizes the remaining C, CO, $CH_4$ and $H_2$ form in the second or middle zone to form $CO_2$ and water. This process result in only trace NOx, CO and $H_2$ in off-gas from the single vessel and requires little auxiliary energy to be added.

In a second embodiment of the present invention, the lowest zone is operated under oxidizing conditions and the middle and upper segments operated under strongly reducing conditions. This process results in less NOx, more CO and $H_2$ output and also requires low auxiliary energy. Auxiliary energy can be provided by electrical heaters.

In the third embodiment of the present invention, all three segments are operated under strongly reducing conditions. This process results in less NOx, increased CO and $H_2$ and requires additional auxiliary energy.

In a fourth embodiment of the present invention, the lower and middle segments are operated under strongly reducing conditions and the upper segment is operated under oxidizing conditions. This process results in low NOx, no CO and $H_2$ output but requires auxiliary energy to be added.

BRIEF DESCRIPTION OF THE DRAWINGS

The FIGURE is a schematic illustration of a system for removing NOx from a waste stream or compound according to a preferred embodiment of the present invention.

DETAILED DESCRIPTION OF PREFERRED EMBODIMENTS

The present invention is an apparatus and process for removing NOx from nitrate bearing compounds and waste product feeds. The present apparatus and processes will be described in particular with respect to radioactive waste but any nitrogen oxide containing waste or product stream can be processed in accordance with the following process and with the components of the system.

The process is based on a single fluidized bed reactor vessel using steam for fluidizing which may be operated under strongly reducing conditions or under strongly reducing conditions in combination with oxidizing conditions. Other fluidizing gases or additives may be utilized to modify the oxidizing or reducing conditions in the reactor. Typical other fluidizing gases include: hydrogen, oxygen (when oxidizing conditions are desired), methane, ammonia, etc. Other additives can be added such as charcoal, carboneceous materials, sugars, hydrogen peroxide, etc. to further modify reducing or oxidizing conditions in the bed. Wet scrubbers are used to treat gaseous effluent from the process. The wastes that can be processed according to the present invention include not only NOx containing waste streams resulting from the decomposition of ion exchange resins, but also NOx containing waste stream resulting from nuclear reprocessing, explosives and energetics, fertilizer and gaseous off-gas streams and the like.

Referring now to The FIGURE, there is shown a system according to the present invention and generally indicated by reference number 10. System 10 includes a single reactor vessel 12. Waste feed, which may be comprised of liquid slurries and sludges 14 and/or solids 16, are fed into the reactor vessel 12. In the case of the liquid slurries and sludges 14, a pneumatic pump, peristaltic pump or progressive cavity 18 may be employed for delivery of the pumpable fluids to the reactor vessel 12. In the case of the solids 16, a screw auger 20 may be employed to deliver the solid waste stream into the reactor vessel 12.

In reactor 12, inert media 22 is used in the fluid bed. Media 22 is preferably an inert material which may serve as a heat sink such as silica or alumina, most preferably, amorphous alumina beads at least 200 and preferably up to 1000 microns in diameter, however beads up to 5,000 microns in diameter can be utilized. Such size beads do not easily elutriate out of the vessel and therefore minimize carryover. Another advantage of the amorphous alumina is that is will not form eutectic salt/glasses that can form harmful agglomerates that affect reactor efficiency as when common silica sand is utilized. The amorphous alumina is also exceptionally strong and hard and resists attrition due to bed friction and impact.

In order to evaporate water present in the waste feeds and to serve as a heat source, charcoal, sugar and/or other carboneceous materials are added to reactor vessel 12, optionally other reductants or catalysts such as iron or nickel oxalate or nitrates may be used. Fluidizing medium (gases) is introduced into reaction vessel 12 via inlet 24. Steam is preferred to combustion gases as the fluidizing medium because it is more reactive, and generates CO and $H_2$ that are highly reducing by steam reformation of carboneceous materials.

Gaseous NOx compounds can be co-injected with the fluidizing gases through inlet 24.

The fluidizing medium can be an inert gas, but is preferably a reforming gas and may have oxygen present. Most preferably, the medium is superheated steam. The fluidizing velocity can range from about 1.0 feet per second or higher depending on the bed media, preferably 3 to 10 feet per second (FPS) depending upon the size of the bed media. Fluidizing gas distributors are designed to provide higher than normal gas/orifice velocities. Typical gas distributor velocities are 100 to 200 FPS, however, in the preferred embodiment gas velocities of >400 FPS are desired.

The high fluidizing gas jet speed has several advantages. High velocity fluidizing gas jets in a vertically oriented bed provides jet impingement on the media to help break down the softer, friable feed and to break-up agglomerates. Moreover, the media beads become self-cleaning due to abrasion in the high impact area around the fluidizing gas distributor.

Reactor vessel 12 is preferable operated in elutriating mode. Sodium and other low melting eutectics are thereby present in only low concentration (<2%) and are quickly carried out of the bed. The media beads are self-cleaning through abrasion. The low inventory of unconverted nitrates or sodium compounds greatly minimizes agglomeration potential.

As discussed above, the reactor vessel 12 may be operated using one of four methods, in the first method, the lower portion of the media bed is operated under oxidizing conditions. To achieve this condition oxygen is mixed with the steam and introduced into the reactor vessel 12 via inlet 24 and may be optionally superheated. The pressure in the reactor vessel 12 preferable about 13 to 15 psia. The reactor vessel 12 is preferable operated at 600 to 800 degrees centigrade. The media bed depth is preferably between about 3 to 8 feet, expanded. The middle portion of media bed in reactor vessel 12 is operated under strongly reducing conditions and the upper portion of the media bed is operated under oxidizing conditions by the addition of oxygen via inlet 25. Temperature is maintained within reactor vessel 12 by heater 26 or by super heating fluidizing gases which provides auxiliary energy as needed, particularly during start-up. When the NOx has been reduced to nitrogen, the nitrogen, steam and other syn gases leave the reaction vessel 12 via port 28. Small sized reformed residues, including entrained particulates also leave via port 28. Heavier solids and debris leave via port 30 and are carried away by screw auger 32 to collector 34. Auger 32 is preferably water cooled. From collector 34 the larger solids and debris may be directed to stabilization processor 36 or to final reformed residue waste collector 38.

The screw auger 32 can be optionally fitted with water washing capability. Water can be introduced into the bottom of screw auger 32 through inlet 60. Water dissolves any soluble sodium salt or other agglomerates that collect in the bottom of the reactor vessel 12. Salt water solution is removed from the bottom of reactor vessel 12 through screened outlet port 62. If desired, the salt water solution from outlet 62 can be collected in residue separator 42.

The nitrogen gas, steam, other syn gas and fine particulates pass through scrubber/evaporator 40. Any non-gaseous reformed residue or particulates collected in the scrubber/ evaporator 40 is directed to residue separator 42 wherein the insoluble reformed residue are separated from the soluble salt solution. The reformed residue is directed to the stabilization processor 36 while the salt solution is directed to salt separator 44 then to a salt dryer 46 and finally to a salt package 48. An optional filter (not shown) can be installed between the reactor gas outlet 28 and the scrubber/ evaporator 40. Solids collected by the optional filter can be directed to residue stabilization processor 36. The cooled and scrubbed syn gas and water vapors then pass to condenser 50. The resultant water is directed to the recycled water tank 52 while the syn gas moves to thermal converter 54. Off-gases from the thermal converter 54 are then monitored for compliance with the applicable environmental requirements prior to release.

Under the conditions of method 1 set forth above, the process treatment results in final gaseous effluent very low in NOx with no CO and $H_2$ output. The system generally requires low auxiliary energy addition. This system does not require the removal of NOx in the off gas scrubber system as NOx levels exiting the reactor 12 are routinely <25 ppm. The addition of thermal converter 54 for CO and $CH_4$ oxidation is also not required.

Alternatively and in a second method of the invention, the lower portion of the media bed in reactor vessel 12 may be operated under oxidizing conditions, as discussed above, the middle portion and the upper portions of the media bed are operated under strongly reducing conditions. Method 2 results in lowered NOx exiting reactor 12 as compared to method 1 but has increased levels of CO and $H_2$ and other trace volatile organics in the reactor 12 output. Additional auxiliary energy is generally needed in the reactor 12 and thermal converter 54 is required.

In method 3, the reactor vessel 12 is operated only under strongly reducing conditions. Method 3 results in lowered NOx, increased CO and $H_2$ and requires increased auxiliary energy and use of thermal converter 54.

In method 4, only the upper portion of the reactor vessel 12 media bed is operated under oxidizing conditions. Method 4 results in low NOx, no CO and $H_2$ output and increased auxiliary energy. The thermal converter 54 is not required in the practice of this method.

Notably, gaseous NOx can also be processed by direct introduction to reactor 12 with other waste feeds.

Testing has demonstrated the usefulness of metal additions to the bed to facilitate NOx reduction. Metal additives are not always required but are useful in maximizing NOx conversion to nitrogen gas. Typical metals that can be used include copper, cobalt, iron or nickel oxalate or nitrates that can be co-injected with the waste feed in concentrations of less than 0.5%.

The addition of charcoal or carbonaceous solids to the bed in sizes ranging up to 0.5 inches in diameter is unique to the preferred embodiment. The large particles of carbon maintain a constant inventory of carbon that is not possible with typical fine sugars, organic powders or liquid chemicals previously used to facilitate nitrate reduction. The presence of larger carbon solids together with addition of soluble carbon in the form of formic acid, sugars, etc. provides superior nitrate reductions. The presence of carbon compounds in the bed will produce highly reducing CO and $H_2$ in the bed via steam reformation.

Additionally, certain additives such as aluminum metal and phosphate salts or oxides can be added to form high melting point salts with alkaline earth elements. For example, sodium phosphate is a high melting point sodium salt compared with sodium eutectics that have relatively low temperature melting points. These combining elements help minimize formations of agglomerations in the bed.

It will be apparent to those skilled in the art of removing NOx from waste feeds that many modifications and substitutions can be made to the preferred embodiments described above without departing from the spirit and scope of the present invention, which is defined by the appended claims.

What is claimed is:

1. A method for converting nitrogen oxides, said method comprising the steps of:
   providing a waste feed containing nitrate;
   heating a reaction vessel containing a bed to an operating temperature of at least 400° C. but below the volatilization temperature of any metal ions in said waste feed;
   injecting superheated steam, oxygen, reductants and waste material into said reaction vessel, wherein said superheated steam is injected at a velocity that agitates said waste material and elutriates fine solids from said bed;
   operating a portion of said bed in reducing conditions so that substantially all of said nitrate in said waste material is reduced at said operating temperature thereby eliminating substantially all of the nitrogen oxides present in such waste material and leaving an inorganic solid residue low in nitrates and a gaseous effluent low in nitrogen oxides.

2. The method as recited in claim 1, wherein said bed is comprised of inert beads.

3. The method as recited in claim 2, wherein said inert beads comprise amorphous alumina beads.

4. The method as recited in claim 1, further comprising the step of agitating said waste material in said reaction vessel to speed reduction by use of superheated steam.

5. The method as recited in claim 1, further comprising a gas distributor for steam wherein the orifice velocity is greater than 300 FPS to facilitate agglomeration break-up and self-cleaning of said bed.

6. The method as recited in claim 1, wherein said steam is injected into said reaction vessel at an average bed velocity of at least 3.0 feet per second.

7. The method as recited in claim 1, further comprising the step of injecting a co-reactant into said reaction vessel to enhance the reduction of nitrogen oxides.

8. The method as recited in claim 7, wherein said co-reactant comprises a solid carboneceous material.

9. The method as recited in claim 7, wherein said co-reactant comprises a soluble carboneceous material.

10. The method as recited in claim 7, wherein said co-reactant comprises metal compounds.

11. The method as recited in claim 10, wherein said metal compounds comprise iron compounds.

12. The method as recited in claim 10, wherein said metal compounds comprise nickel compounds.

13. The method as recited in claim 10, wherein said metal compounds comprise copper compounds.

14. The method as recited in claim 10, wherein said metal compounds comprise cobalt compounds.

15. The method as recited in claim 1, further comprising the step of co-injecting combining additives to form higher melting point alkaline earth salts.

16. The method as recited in claim 13, further comprising the step of co-injecting aluminum compounds, phosphate compounds or mixtures thereof to form higher melting point salts.

17. The method as recited in claim 1, wherein said reaction vessel contains a bed of alumina beads having a diameter of at least approximately 300 microns and said steam is injected at a velocity sufficient to fluidize said bed.

18. The method as recited in claim 1, wherein said reaction vessel contains a bed of alumina beads having a diameter of approximately 2000 microns and said steam is injected at a velocity sufficient to agitate said beads in said bed.

19. The method as recited in claim 1, further comprising the step of co-injecting oxygen with said steam into said reaction vessel.

20. The method as recited in claim 17, wherein said oxygen is co-injected at bottom zone of said reaction vessel for heat generation and to oxidize fixed carbon in said bed.

21. The method as recited in claim 17, wherein said oxygen is co-injected at the top zone of said reaction vessel for oxidizing volatile organics, CO and $H_2$.

22. The method as recited in claim 1, wherein said waste material is in solid form, liquid form, gaseous form or mixtures thereof.

23. The method as recited in claim 1, further comprising the step of removing larger solids out of the bottom of said reaction vessel.

24. The method as recited in claim 1, further comprising washing said bed to dissolve soluble salts and agglomerates.

25. The method as recited in claim 24, wherein said washing takes place in the bottom section of said reactor.

26. A method for converting nitrogen oxides, said method comprising the steps of:

heating a reaction vessel that contains a bed of inert beads to an operating temperature;

injecting steam and waste materials or compounds into said reaction vessel, said steam is injected at a velocity that agitates said waste material and elutriates fine solids from said bed, said reaction vessel having a first portion, a second portion and a third portion;

co-injecting oxygen with said steam such that said first portion is operated under oxidizing conditions;

operating said second portion under reducing conditions; and injecting oxygen into said third portion such that it operates under oxidizing conditions.

27. The method as recited in claim 26, wherein said inert beads comprise amorphous alumina beads.

28. A method for removing nitrogen oxides, said method comprising the steps of:

heating a reaction vessel that contains a bed of inert beads to an operating temperature;

injecting steam and waste materials or compounds into said reaction vessel, wherein said steam is injected at a velocity that agitates said waste material and elutriates fine solids from said bed, said reaction vessel having a first portion, a second portion and a third portion;

co-injecting oxygen with said steam such that said first portion is operated under oxidizing conditions; and operating said second and third portions under reducing conditions.

29. The method as recited in claim 28, wherein said inert beads comprise amorphous alumina beads.

30. A method for removing nitrogen oxides, said method comprising the steps of:

heating a reaction vessel that contains a bed of inert beads to an operating temperature;

injecting steam and waste materials or compounds into said reaction vessel, wherein said steam is injected at a velocity that agitates said waste material and elutriates fine solids from said ; bed, said reaction vessel having a first portion, a second portion and a third portion co-injecting oxygen with said steam such that said third portion is operated under oxidizing conditions; and operating said first and second portions under reducing conditions.

31. The method as recited in claim 30, wherein said inert beads comprise amorphous alumina beads.

* * * * *